United States Patent [19]

Andrews

[11] 4,390,871
[45] Jun. 28, 1983

[54] CIRCUIT FOR DETECTING REDUCTION IN POWER

[75] Inventor: Michael W. Andrews, Whippany, N.J.

[73] Assignee: Bell Telephone Laboratories, Incorporated, Murray Hill, N.J.

[21] Appl. No.: 258,678

[22] Filed: Apr. 29, 1981

[51] Int. Cl.³ .................................................. G08B 21/00
[52] U.S. Cl. ........................................ 340/659; 361/92; 363/17
[58] Field of Search ............... 340/658, 659, 661, 663; 363/17, 26, 21, 56; 361/92

[56] References Cited

U.S. PATENT DOCUMENTS 4,317,223  2/1982  Farmer, Jr. ..................... 363/21 X
4,326,245  4/1982  Saleh .............................. 340/658 X

*Primary Examiner*—John W. Caldwell, Sr.
*Assistant Examiner*—Daniel Myer
*Attorney, Agent, or Firm*—R. O. Nimtz

[57] ABSTRACT

When the input power from a resistive source to a DC-DC converter decreases, the pulse width of the switching transistor increases for a given load. When the pulse width increases above a threshold (14), a Schmidt Trigger (36) will operate to generate a plurality of control signals (42,44,46). The threshold is set by a plurality of resistors (28,30,32,34). In response to the control signals (42,46,48), telecommunications traffic through a remote carrier terminal will be adjusted.

9 Claims, 2 Drawing Figures

CIRCUIT FOR DETECTING REDUCTION IN POWER

BACKGROUND OF THE INVENTION

1. Field of the Invention

This invention relates to DC-DC converters and, in particular, to a circuit for detecting the reduction in power supplied to a converter.

2. Description of the Prior Art

When the power from a resistive source supplied to any converter is decreased, thereby decreasing the voltage at the input to the converter, the width of the drive pulse to the switching transistor will be increased in attempting to increase the duty cycle (or ON time) of the switching transistor. It is necessary to know when there is such a decrease in power supplied to the converter so that the load on the converter may be reduced.

In the prior art, the decrease in input power is determined by detecting when the output current from the converter exceeds a predetermined threshold value corresponding to full load, namely, the maximum duty cycle of the switching transistor. The disadvantage with the prior art lies in detecting the input power reduction after full load has been reached. It is necessary to know when there is an input power reduction before full load is reached, particularly in a large parallel DC-DC converter system, so that the load on the converter system may be reduced, thereby preventing system failure.

SUMMARY OF THE INVENTION

In accordance with the illustrative embodiment of the present invention, when the width of the drive pulse to the switching transistor in a converter increases above a predetermined threshold, a control signal is generated for indicating that there is a reduction in the supply of power to the input of the converter.

An advantage of the present invention is the ability to anticipate the loss of power before the worst condition, corresponding to full load, is reached. In response thereto, the telecommunication traffic through a carrier terminal, located remotely from a telephone central office, can be reduced.

DETAILED DESCRIPTION

Figure 1:
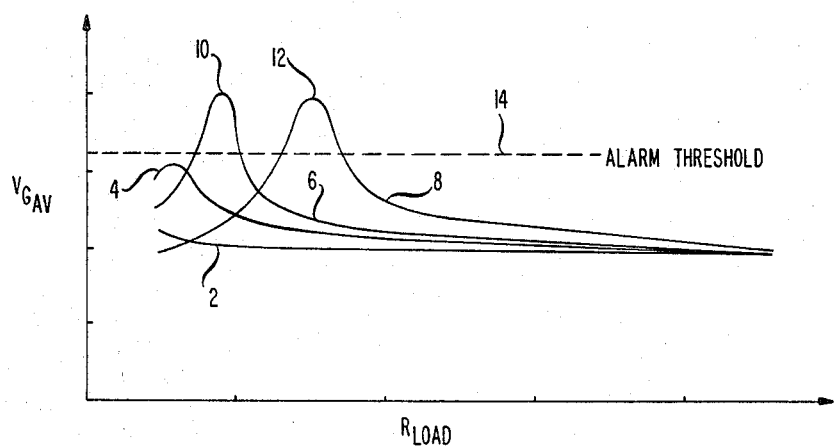
FIG. 1 shows characteristics of the variations of drive pulse voltage with load resistance useful in describing the present invention.

Referring to FIG. 1 there are shown characteristics 2, 4, 6 and 8 drawn for various power source impedances of 215 ohms, 464 ohms, 681 ohms and 1000 ohms, respectively. The characteristics represent the average drive pulse voltage of the switching transistors in the converters plotted against the load resistance connected to the output of a system of such converters connected in parallel.

In a constant frequency converter, the sum of the ON and OFF times of the switching transistor is constant. Therefore, as the drive pulse width of the switching transistor increases, the percentage of the ON time to the sum of the ON and OFF times increases. Referring to FIG. 1, as the load resistance decreases, the pulse width increases until a peak is reached as shown by points 10 and 12 on curves 6 and 8, respectively. Points 10 and 12 represent the maximum duty cycle and are known as the full load points. If the load resistance is decreased further, loss of regulation results.

In practice, however, it is necessary and desirable to keep the duty cycle below this maximum level by some safety margin, represented by the threshold 14 in FIG. 1. Consequently, it is useful to know when the pulse width exceeds threshold 14, for example, by generating control signals or by producing alarms.

Figure 2:
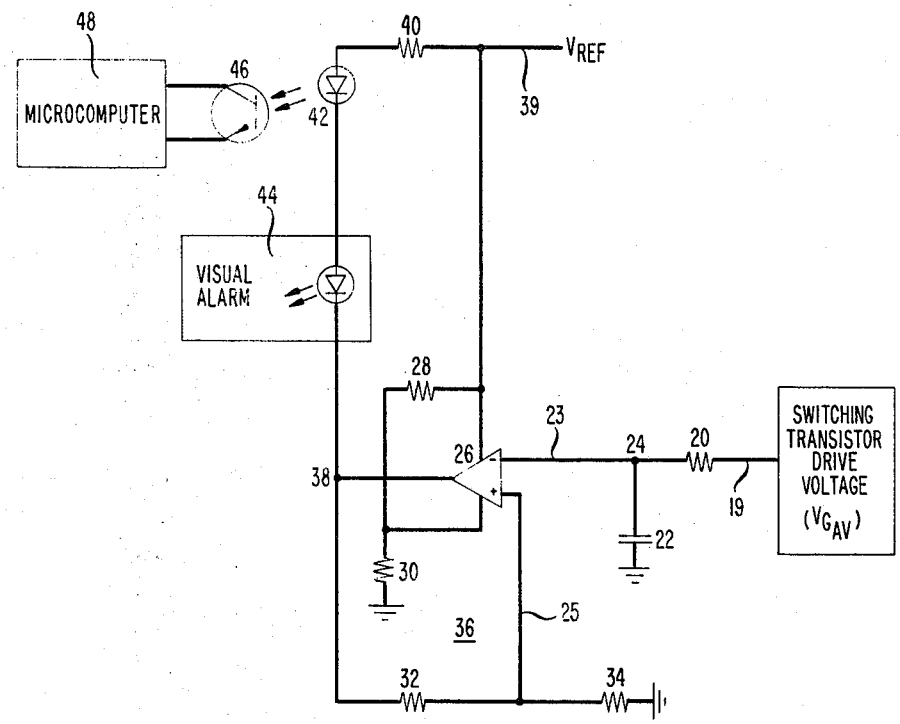
FIG. 2 shows an alarm circuit embodying the present invention.

Referring to FIG. 2, there is shown an alarm circuit embodying the present invention. The drive pulse voltage to a switching transistor (not shown) is presented at lead 19. Resistance 20 and capacitor 22 filter the drive pulse voltage and produce an average value at node 24.

The operational amplifier 26 and resistors 28, 30, 32 and 34 together form a Schmidt Trigger 36. The values of resistors 28, 30, 32 and 34 set the alarm threshold 14 of FIG. 1. When the average drive pulse voltage at lead 23 exceeds the threshold signal on lead 25, the Schmidt Trigger 36 operates to produce a low signal at node 38, thereby changing from a normally high state thereat. In response to this change in voltage levels at node 38, current flows from a reference voltage on lead 39 through resistor 40, light emitting diode (LED) 42, and LED 44. LED 44 produces a visual alarm. Resistor 40 is useful in limiting the current flow therethrough to protect the LEDs 42 and 44.

LED 42 and transistor 46 together form an optoisolator for indicating the alarm condition to a microcomputer 48. In response to the alarm condition, microcomputer 48 causes telecommunications traffic to be limited through a carrier terminal (not shown) located remotely from a telephone central office.

When the fault has been cleared or when the load has been decreased, the average drive pulse on lead 23 will drop below the threshold signal on lead 25 thereby causing the Schmidt Trigger 36 to operate. Immediately thereafter, the node 38 will change from a low state to a high state and current will cause to flow through LEDs 42 and 44. The Schmidt Trigger 36 is used because of its fast response to changes in its input according to the well-known hysteresis characteristic.

As stated above, Schmidt Trigger 36 is used to respond rapidly to a reduction of input power to a converter. In response thereto, microcomputer 48 reduces the traffic switched through a remote carrier terminal, or carries out some other remedial action. In a preferred embodiment, the traffic may be reduced by at least two different methods. According to one method, a fixed percentage of the traffic may be reduced. According to another method, the microcomputer 48 determines the traffic through the remote carrier terminal when the alarm condition is received and prevents any increase in traffic past the threshold point 14 of FIG. 1.

What is claimed is:

1. A method for providing a control signal indicating a reduction in power delivered to the input of a DC-DC converter characterized by the steps of averaging the voltage levels of the drive pulses to a switching transistor in said converter, comparing said average drive pulse voltage level with a threshold voltage level (14), and generating a control signal (42,46) when said average drive pulse voltage level exceeds said threshold voltage level.

2. An alarm circuit for indicating reduction in power delivered to the input of a DC-DC converter characterized by
means (20,22) for generating an average of the drive pulses to a switching transistor in said converter,
means (28,30,32,34) for setting a threshold, and
means (36) for determining when said average drive pulse exceeds said threshold.

3. The alarm circuit according to claim 2 further characterized by
means (44) for providing a visual alarm.

4. The alarm circuit according to claim 2 further characterized in that
said means (36) for determining when said average drive pulse exceeds said threshold comprises a Schmidt trigger.

5. The alarm circuit according to claim 2 further characterized by
means (42,46) for generating a control signal when said average drive pulse exceeds said threshold.

6. A control signal generating circuit for indicating input power reduction to a DC-DC converter characterized by
an operational amplifier (26) comprising first (23) and second (25) input leads,
said first input lead (23) being connected to a resistor (20) and a capacitor (22) for generating an average of the drive pulses to a switching transistor in said converter, and
said second lead (25) being connected to a plurality of other resistors (28,30,32,34) for setting the threshold of said operational amplifier.

7. The control signal generating circuit according to claim 6 further characterized by
an optoisolator (42,46) for generating said control signal in response to said average drive pulse being greater than said threshold.

8. The control signal generating circuit according to claim 6 further characterized by
a light emitting diode (44) for producing a visual alarm when said average drive pulse exceeds said threshold.

9. The control signal generating circuit according to claims 7 or 8 further characterized by
a current limiting resistor (40) for protecting said optoisolator (46,42) and said light emitting diode (44).

* * * * *